July 9, 1963     JEAN-PAUL VANDENHOECK     3,097,075
METHOD FOR PRODUCING A GRADED PULVERULENT MATERIAL
Filed July 19, 1961
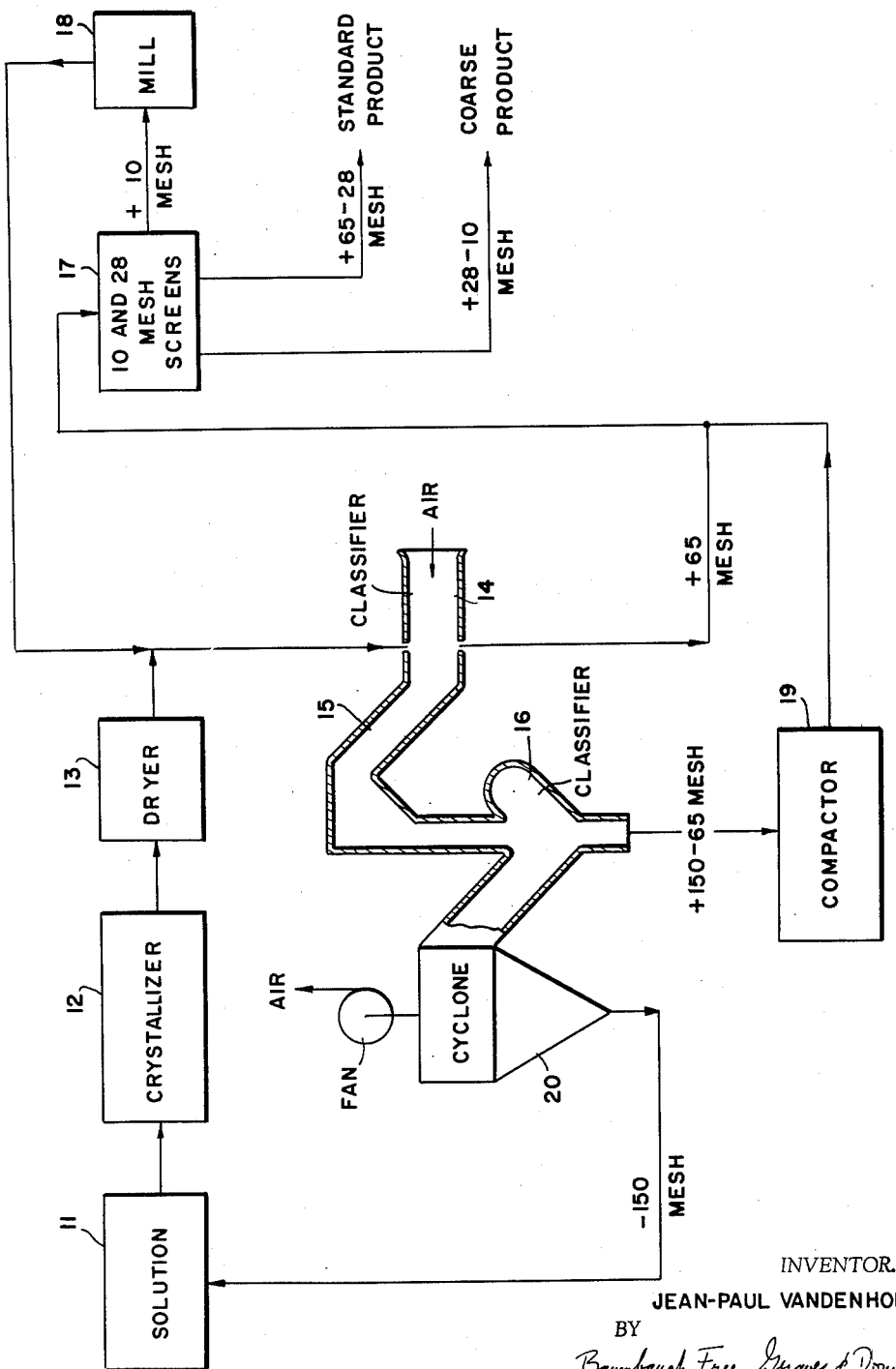
INVENTOR.
JEAN-PAUL VANDENHOECK
BY
ATTORNEYS

3,097,075
METHOD FOR PRODUCING A GRADED PULVERULENT MATERIAL
Jean-Paul Vandenhoeck, New York, N.Y., assignor to Buell Engineering Company, Inc., New York, N.Y., a corporation of New York
Filed July 19, 1961, Ser. No. 125,109
6 Claims. (Cl. 23—302)

This invention relates to the production of graded pulverulent material, and, more particularly, to a method for producing graded pulverulent material crystallized out of solution.

The invention finds particular application in the potash producing industry. To elaborate, potash is typically produced by crystallization from a solution, thereafter dried, and then screened into various particle sizes to produce finished products. During the screening process, fine particles of the material, not suitable for commercial use, are returned into solution to be subsequently crystallized, dried, and screened as before.

In the present invention, a first gas classification is employed to preliminarily classify the dried crystallized material and to remove therefrom all particles more fine than a predetermined particle size that approximates the smallest size particle commercially usable. The separated fine particles are then further gas classified in a second classification, with the larger size particles of the group separated out and thereafter compacted together to form particles suitable for subsequent screening into various commercially usable sizes or for recycling to be again preliminarily gas classified. The very fine particles from the second classification, not separated out for compacting, are returned into solution for subsequent recrystallization and a repeating of the above process.

Gas classification in accordance with the invention is more advantageous than the mere recycling of commercially unusable screened fine particles into solution, since the larger ones of these fine particles may be separated out and compacted together to form a usable product, thereby eliminating the necessity of passing the entire amount of fine particles back into solution. This reduces a major portion of the costs involved in an expensive solution process, a reduction which cannot be brought about by the use of screens alone, since finely meshed screens capable of separating out particles suitable for compacting are impractical, the fine mesh of such screens becoming clogged almost immediately. Further, gas classifying the particles in a preliminary classification, rather than screening the particles, is advantageous in that the film of extremely fine particles that normally "blankets" a screened product, i.e., the film that is formed above the coarse particles not passing through the screens in a screening process, is entirely removed, thereby ensuring that no "dust" is present in a coarse product.

Although the invention has been described generally above, a better understanding of it may be obtained by consulting the following detailed description, which is to be read in conjunction with the appended drawing containing a single FIGURE showing, in block and diagrammatic form, exemplary apparatus capable of carrying out the steps of the invention.

Turning to the figure, a solution of material, such as, for example, potash that is obtained from a refining system (not shown), is indicated in the block 11. The solution is applied to a crystallizer 12 which crystallizes the material out of solution. The crystallized material is then applied to a dryer 13 from which it is passed through a gas classifier 14 utilizing, for example, air to effect a particle separation at a first cut point. By way of example only, the classifier 14 may be set to provide a cut point at 65 mesh. This means that all particles passing through the classifier that are of a size smaller than the largest particle that can pass through a screen formed with 65 mesh per unit area are carried by the air through a tube 15 and are applied to a second gas classifier 16. The particles passing through the classifier 14 that are greater in size than 65 mesh are applied to a screening system 17 which, for example, has been shown in the figure to comprise screens of 10 mesh per unit area and 28 mesh per unit area.

In the screening system 17, the particles of a size greater than 10 mesh are applied to a mill 18 where they are crushed to smaller sizes and reapplied to the classifier 14. The particles passing through the 10 mesh per unit area screens (not shown) in the screening system 17, i.e., the particles between 65 mesh and 10 mesh, are screened in 28 mesh per unit area screens (not shown). The particles not passing through the 28 mesh screens, i.e., the particles between 28 mesh and 10 mesh size, form what may be termed a "coarse" product. The particles passing through the 28 mesh screens, i.e., the particles between 65 mesh and 28 mesh form what may be termed a "standard" product. Both the coarse and the standard products are conveyed away for subsequent operations, such as, for example, packaging and the like.

Referring again to the second gas classifier 16, the particles of a size less than 65 mesh that are carried through the tube 15 are further classified within the classifier 16 which provides a cut point, for example, at 150 mesh. Therefore, all relatively heavy particles between 150 mesh and 65 mesh pass through the classifier and are applied to a compactor 19 wherein they are compacted to form particles of a size greater than 65 mesh. These compacted particles are then applied to the screening system 17 wherein they are screened to form a standard product, a coarse product, and those greater in size than the coarse product are returned to the mill 18 for further grinding and subsequent application to the classifier 14. Alternatively, the compacted particles from the compactor 19 may be recycled back to the classifier 14 rather than applied directly to the screening system 17. This ensures that any fine particles remaining after the compacting operation would be removed prior to the screening operations.

The fine particles of a mesh size less than 150 mesh, for example, that are separated in the classifier 16 are carried through a cyclone system 20 and returned into solution in the block 11.

By utilizing air classification immediately following the drying step in the process described above, fine particles are immediately removed from the mass of ungraded particulate material. This permits the screening section 17 to deal only with particles of a standard product size, a coarse product size, and a size larger than the coarse product size which are applied to a mill. Further, the preliminary gas classification effected by the classifier 14 is more advantageous than screening, since it ensures that all fine particles are removed, including the fine film of "dust" normally retained over the coarse product in a screening process.

By providing a second air classification, the fine particles separated out during the first air classification may be further separated into particles suitable for compacting. This normally is not possible with finely meshed screens, as such screens tend to clog when handling particles of a size much smaller than the size of commercially usable particles. Therefore, in a grading process using only screens of a relatively coarse mesh, it is required to apply back into solution all fine particles that pass through such screens. This is very uneconomical, however, since the capacity of the solution section of the system must be enlarged to handle all the fine material not suitable for commercial use. With the second air classification, then, coupled with the compacting of the larger commercially unusable particles, only a small group of extremely fine particles is finally returned to the solution section of the system, resulting in considerable savings in costs.

A further advantage in the use of air clasification resides in the ability to change easily the cut point of a classification by simply adjusting the flow of air through the classifier, which does not necessitate a substitution of screens involving time, material, and labor.

From the detailed description given above, it is apparent that the invention is susceptible of modifications which nonetheless are embraced within the inventive concepts involved. Further, the invention should not be taken as limited to the specific cut point described in the detailed description, which were chosen simply for illustration only. Accordingly, all modifications and variations that fall within the scope of the invention should be deemed to be encompassed by the following claims which are set forth as follows to define the invention.

I claim:

1. In a method of producing a graded pulverulent material from solution, the steps comprising crystallizing the material from solution, drying the crystallized material to produce dry particles of material, classifying the particles to segregate those particles that are smaller than a first reference particles, gas classifying the segregated particles into primary and secondary groups of particles larger than and smaller than respectively a second reference particle, compacting the particles in the primary group to form particles substantially at least as large as the first reference particle, and returning the particles in the secondary group into solution.

2. The method as recited in claim 1 wherein the second reference particle is no smaller than 150 mesh and no larger than 65 mesh.

3. In a method of producing a graded pulverulent material from solution, the steps comprising crystallizing the material from solution, drying the crystallized material to produce dry particles of pulverulent material, classifying the pulverulent material to separate the material into first and second groups of particles larger than and smaller than respectively a first reference particle, gas classifying the second group of particles to separate the second group into third and fourth groups of particles larger than and smaller than respectively a second reference particle, compacting the third group of particles to produce particles substantially the same size as those in the first group, classifying the compacted particles and the first group of particles thereby to grade them into predetermined particle sizes, and returning into solution the fourth group of particles.

4. The method as recited in claim 3 wherein the first reference particle is no smaller than 65 mesh and the second reference particle is no smaller than 150 mesh and no larger than 65 mesh.

5. In a method of producing a graded pulverulent material from solution, the steps comprising crystallizing the material from solution, drying the crystallized material to produce dry particles of pulverulent material, classifying in a first classification the pulverulent material to separate the material into first and second groups of particles larger than and smaller than respectively a first reference particle, gas classifying in a second classification the second group of particles to separate the second group into third and fourth groups of particles larger than and smaller than respectively a second reference particle, compacting the third group of particles to produce particles substantially the same size as those crystallized out of solution, recycling the compacted particles to effect the first and second classifications, classifying the first group of particles thereby to grade them into predetermined particle sizes, and returning into solution the fourth group of particles.

6. The method as recited in claim 5 wherein the first classification comprises a gas classification.

References Cited in the file of this patent

UNITED STATES PATENTS 2,827,366    Saeman _____ Mar. 18, 1958

FOREIGN PATENTS 617,861    Canada _____ Apr. 4, 1961